United States Patent
Bridgen et al.

(10) Patent No.: US 9,915,540 B2
(45) Date of Patent: Mar. 13, 2018

(54) GENERATING ROUTING INFORMATION FOR A TARGET LOCATION

(71) Applicant: International Business Machines Corporation, Armonk, NY (US)

(72) Inventors: Anna Bridgen, Basingstoke (GB);
Christopher J. Poole, Romsey (GB);
Stephen J. Upton, Winchester (GB);
Mark A. Woolley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 14/819,490

(22) Filed: Aug. 6, 2015

(65) Prior Publication Data

US 2017/0038221 A1  Feb. 9, 2017

(51) Int. Cl.
*G01C 21/34* (2006.01)
*H04W 4/02* (2018.01)

(52) U.S. Cl.
CPC ..... *G01C 21/3438* (2013.01); *G01C 21/3492* (2013.01); *H04W 4/02* (2013.01)

(58) Field of Classification Search
CPC ........ H04W 4/02; H04W 4/021; H04W 4/022
See application file for complete search history.

(56) References Cited

U.S. PATENT DOCUMENTS

| | | | |
|---|---|---|---|
| 7,610,151 B2 | 10/2009 | Letchner et al. | |
| 7,831,386 B2 | 11/2010 | Cummings | |
| 8,864,847 B1 * | 10/2014 | Casaburi | G06F 21/88 726/22 |
| 9,369,847 B2 * | 6/2016 | Borghei | |

(Continued)

FOREIGN PATENT DOCUMENTS

WO  2014159291 A2  10/2014

OTHER PUBLICATIONS

Chou, et al., "Intersection-Based Routing Protocol for VANETs", Department of Computer Science and Information Engineering, National Central University, Published Mar. 2, 2011, © Springer Science+ Business Media, LLC 2011, pp. 105-124, <http://link.springer.com/article/10.1007/s11277-011-0257-z>.

(Continued)

*Primary Examiner* — Jelani A Smith
(74) *Attorney, Agent, or Firm* — Daniel R. Simek

(57) ABSTRACT

Aspects of the present invention disclose a method, computer program product, and system for generating routing information. The method includes one or more processors acquiring a current location for each of a plurality of mobile computing devices. The method further includes one or more processors identifying a range that corresponds to each of the plurality of mobile computing devices. The method further includes one or more processors determining a target location at which at least two of the plurality of mobile computing devices can be in proximity. The determined target location is based on the acquired current location of each of the plurality of mobile computing devices and the identified ranges that correspond to each of the plurality of mobile computing devices. The method further includes one or more processors generating routing information corresponding to the at least two of the mobile computing devices and the determined target location.

19 Claims, 7 Drawing Sheets

(56) References Cited

U.S. PATENT DOCUMENTS

| | | | |
|---|---|---|---|
| 2006/0229058 A1* | 10/2006 | Rosenberg | H04L 67/18 455/404.2 |
| 2006/0287819 A1 | 12/2006 | Brulle-Drews et al. | |
| 2007/0124068 A1 | 5/2007 | Nakayama et al. | |
| 2009/0235176 A1* | 9/2009 | Jayanthi | H04L 12/189 715/738 |
| 2010/0100307 A1* | 4/2010 | Kim | G01S 5/0027 701/119 |
| 2010/0151880 A1* | 6/2010 | Jang | H04L 12/5895 455/456.1 |
| 2012/0052870 A1* | 3/2012 | Habicher | H04W 8/16 455/456.1 |
| 2012/0201153 A1 | 8/2012 | Bharadia et al. | |
| 2013/0005362 A1* | 1/2013 | Borghei | H04W 4/021 455/456.3 |
| 2014/0095258 A1* | 4/2014 | Weiss | G06Q 30/0211 705/7.32 |
| 2014/0244329 A1* | 8/2014 | Urban | G06Q 10/06311 705/7.15 |
| 2014/0249748 A1 | 9/2014 | Strassenburg-Kleciak | |
| 2014/0368601 A1* | 12/2014 | deCharms | H04W 4/021 348/14.02 |
| 2015/0365246 A1* | 12/2015 | Kane | H04L 12/1895 709/203 |
| 2017/0038221 A1* | 2/2017 | Bridgen | G01C 21/3492 |
| 2017/0069214 A1* | 3/2017 | Dupray | G08G 5/0021 |

OTHER PUBLICATIONS

Hung, et al., "Cross Layer Association Control for Throughput Optimization in Wireless LANs with inter-AP Interference", MSWiM '10, Oct. 17-21, 2010, Copyright 2010 ACM, pp. 210-217, <http://dl.acm.org/citation.cfm?id=1868556>.

Xie, et al., "An Intersection Origin-Destination Flow Optimization Problem for Evacuation Network Design", Center for Transportation Research, Department of Civil, Architectural and Environmental Engineering, The University of Texas at Austin, Presented at the 90th Transportation Research Board Annual Meeting, Jan. 2011, 27 pages, <https://www.academia.edu/471635/Intersection_Origin-Destination_Flow_Optimization_Problem_for_Evacuation_Network_Design>.

"Beamforming", From Wikipedia, the free encyclopedia, Last Modified Feb. 10, 2015, 5 pages, <http://en.wikipedia.org/wiki/Beamforming>.

"All Beamforming Solutions Are Not Equal", © 2013, Ruckus Wireless, Inc., Revised Jan. 2013, 9 pages.

* cited by examiner

GENERATING ROUTING INFORMATION FOR A TARGET LOCATION

BACKGROUND OF THE INVENTION

The present invention relates generally to the field of providing routing information to mobile wireless devices, and more particularly to providing routing information to multiple mobile wireless devices to rout those wireless devices to a point of intersection.

Global positioning system (GPS) navigation systems can utilize GPS navigation devices, which calculates geographical location by receiving information from GPS satellites. In current implementations, GPS navigation devices and receivers can be present in automobile and smartphones. GPS devices have capabilities that include: providing maps, turn-by-turn navigation, providing directions directly to a vehicle, traffic congestion maps, and information on nearby objects. GPS navigation devices are widely utilized to provide routing information to mobile devices. For example, a driver in a vehicle may use a routing application (e.g., that utilizes GPS navigation) on a mobile telephone to route the driver to a specified destination.

SUMMARY

Aspects of the present invention disclose a method, computer program product, and system for generating routing information. The method includes one or more processors acquiring a current location for each of a plurality of mobile computing devices. The method further includes one or more processors identifying a range that corresponds to each of the plurality of mobile computing devices. The method further includes one or more processors determining a target location at which at least two of the plurality of mobile computing devices can be in proximity. The determined target location is based on the acquired current location of each of the plurality of mobile computing devices and the identified ranges that correspond to each of the plurality of mobile computing devices. The method further includes one or more processors generating routing information corresponding to the at least two of the mobile computing devices and the determined target location. In an additional aspect, the method further includes one or more processors communicating the generated routing information to the at least two mobile computing devices.

DETAILED DESCRIPTION

Figure 1:
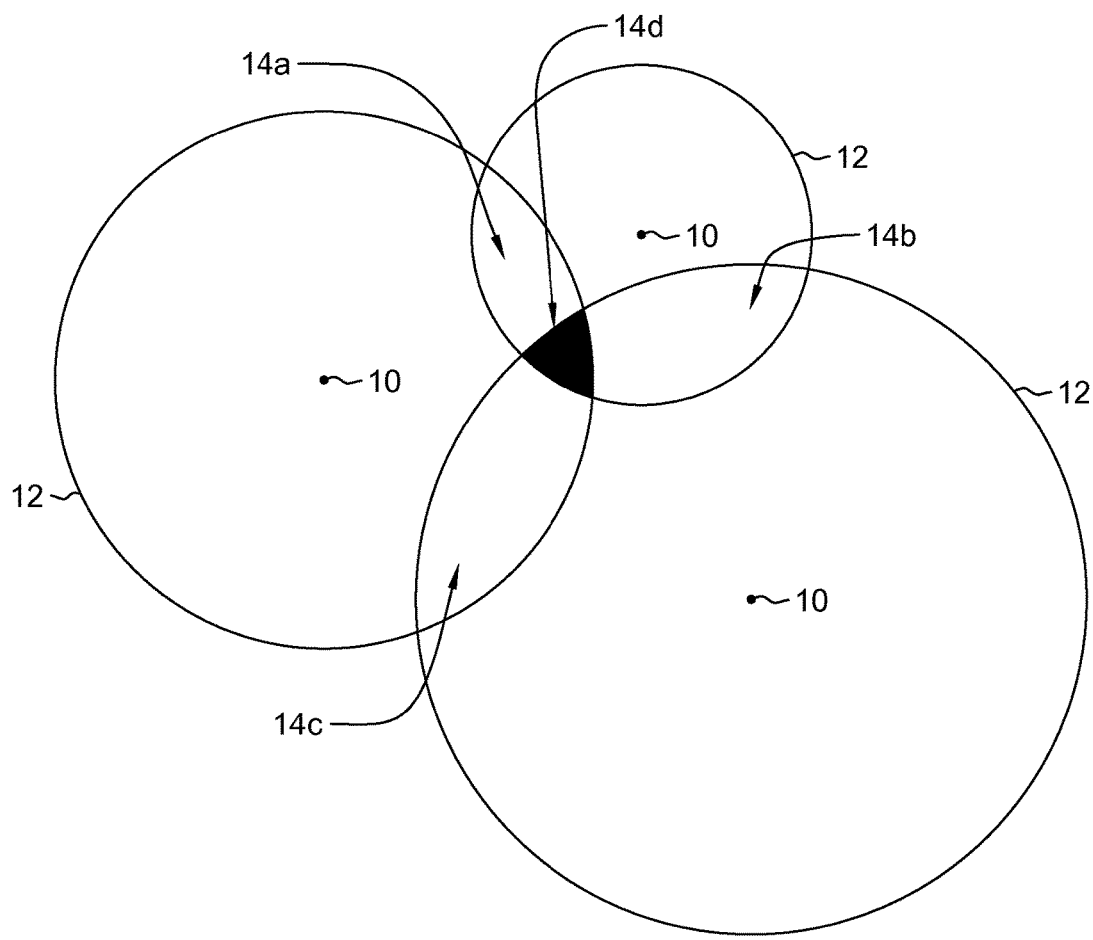
FIG. 1 is a schematic diagram of three mobile wireless devices and their ranges, in accordance with an embodiment of the present invention.

FIG. 1 shows three mobile wireless devices 10, with respective ranges shown by respective circles 12. The mobile wireless devices 10 can be mobile phones being carried by runners, for example, with each circle 12 representing the maximum distance that a specific runner can complete, assuming that the runner will return to their starting point. A runner can choose a route or receive a provided route (e.g., provided by a suitable app present on a respective instance of mobile wireless devices 10. A runner listening to music through a set of headphones connected to an instance of mobile wireless devices 10 while running can also be provided with routing information via the headphones (e.g., as voice commands).

Many methods exist for routing travelers to a destination, some of which have broad applicability while others are designed for specific scenarios. Drivers can use a global positioning system (GPS) for navigation and such implementations are often complimented with congestion avoidance mechanisms. Other variants include routing users past landmarks and advertisements. In contrast to existing methods, a method routes the runners (e.g., or other types of individuals) through intersections with other runners for mutual benefit. The method provides identification of mutually-agreed meeting points that benefit all runners. The method for routing runners uses emergent opportunities that occur as the runners move towards each other. The routing method works by identifying serendipitous intersections and adjusting routing accordingly. Intersections 14a, 14b, 14c, and 14d are shown in FIG. 1.

The methodology can be used in many different scenarios in addition to route planning for runners; for example, the routing method can also be used by delivery drones. Parcel delivery companies can provide deliveries over short distances using drones. The routing methodology would facilitate deliveries over longer distances by sharing a journey across multiple drones, for example. For runners, the method could be used as part of a route planning/tracking application so that runners are intentionally routed past one another to increase the gamification of running further by using the presence of other runners as motivation. A runner will be deliberately routed into proximity with one or more other runners to increase their enjoyment and motivation.

Generally, routing takes a user from A to B. In an example embodiment shown in FIG. 1, a runner's route can take the runner from A (the starting point) and then back to A (returning to the starting point), and delivery vehicles return to their origin after all deliveries have been completed. The range of runners and delivery vehicles are both constrained, in the case of a runner by the fitness of the runner and in the case of a delivery vehicle by the operating capacity of the delivery vehicle and/or the working hours of the driver. When a runner embarks on a run, a range of the runner can be represented by the circle 12, which is centered on the starting point of the runner. The runner can run straight to the edge of their range, then turn around and run straight back. This is a simplification, as there may be many obstacles in the runner's way, but the concept largely applies.

The runner's range can be determined by an analysis of past runs or with an input from the runner themselves. The runner's remaining range reduces as they run. In other words, all possible points that the runner can travel to before returning to their end point (which is likely to be the starting point) reduces as time goes by. Delivery drones can be considered in the same way. The range of a delivery drone reduces as the drone travels; and therefore, the drone can ensure they can reach a suitable stopping point before they run out of power. Thus, the remaining range contains at least one safe stopping location where power is available. When multiple runners or drones are considered, then one or more intersections 14 will become apparent for the devices being considered (the runner's mobile phone being a proxy for the runner).

In the case of runners, the routing method takes into account the ranges of multiple runners, which for simplicity are represented as circles (in FIG. 1), which are shrinking in size as the runners run, in order to account for a runner's need to return home and route the runners such that multiple runners pass near each other (are in proximity to each other). This could be accomplished by overlaying the ranges of all participating runners on the same map and highlighting areas (i.e., intersections 14) that multiple runners can reach (as shown in FIG. 1) and areas such as intersections 14 would be suggested to runners as potential targets. In terms of routing the runners, this could be simply accomplished by placing a waypoint within the overlapping areas for all participating runners or by voice commands from a run tracking app.

A preferred approach would see all mobile wireless devices 10 (and hence all runners) being directed to the same area (e.g., intersection 14d), increasing the likelihood of the runners routes intersecting, this being defined as a desirable outcome. This approach could scale to more runners by giving higher priority to zones that most runners could reach; for example, using a heat map approach, which can further increase the likelihood of intersecting running routes. In FIG. 1, the dots represent the runners, and the circles 12 represent the ranges of the respective runners. In this case, the method would direct the runners to the central area (i.e., intersection 14d), where the runners would be more likely to encounter other runners and the greatest (maximum) number of mobile wireless devices 10 can reach this target location.

In the case of drones, a very similar approach could be used but with one drone (drone1 from base1) dropping off a package in the overlapping area (i.e., intersection 14a) and another drone (drone2) picking up the package to carry back to their base (base2). In the case of drones, there are additional constraints for the outcome to be favorable in that base2 must be closer to the intended destination of drone1's package than base1, and the area where the package is left must be safe (or contain a predefined safe-zone). Otherwise, the approach used could be much the same.

The above approach could also include processing which considers the distances involved and the speed of each instance of mobile wireless devices 10 (and hence the associated runner or drone) to ensure that the identified intersections are appropriate. In both of the examples given, exact timing is not required. For runners, the method increases the probability of different users running in sight of one another, and in the case of drones, providing the drop-off zone is safe and that the drone currently in possession arrives first or shortly after the second drone, there will be no or little impact on total delivery time. The target destination (e.g., intersections 14) can be chosen based on the current speeds of users, since the range calculation assumes that all of the mobile wireless devices 10 are travelling at the same speed, which may not be the case.

Figure 2:
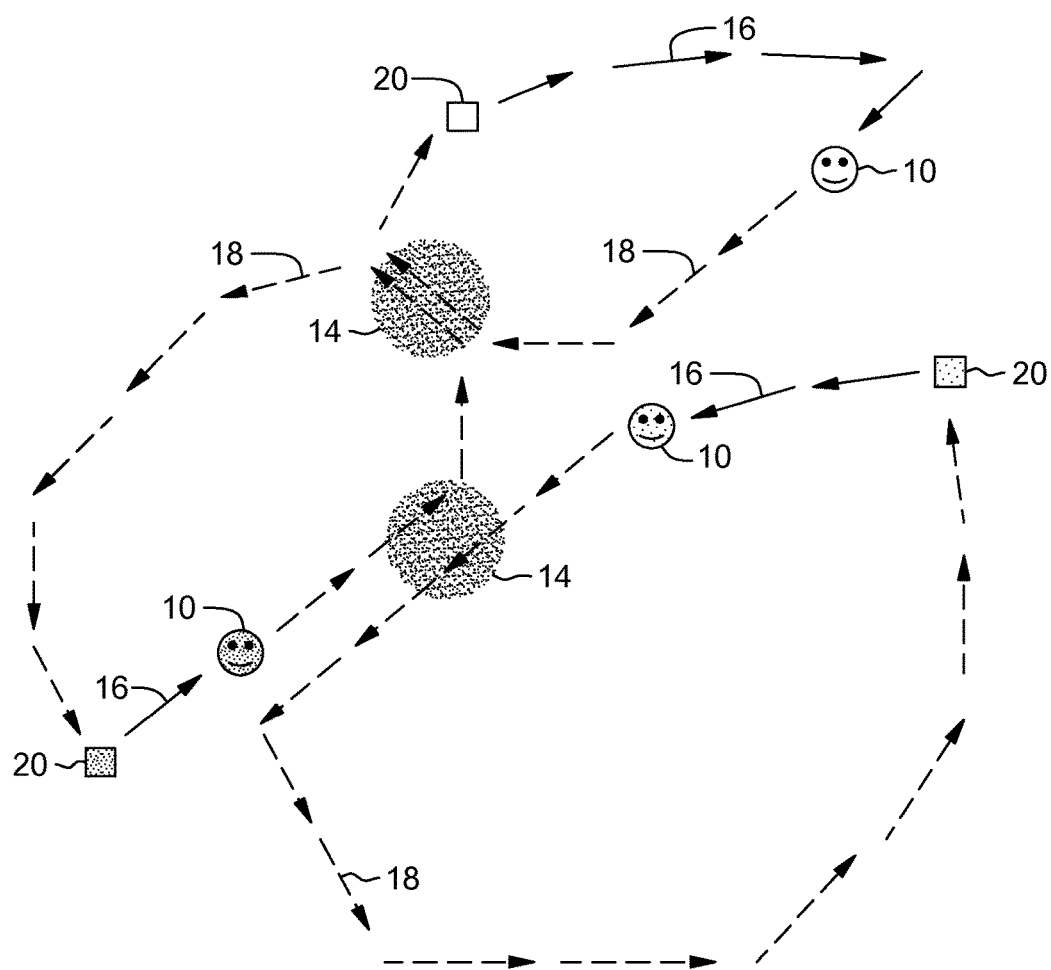
FIG. 2 is a schematic diagram of the three mobile wireless devices and their routes, in accordance with an embodiment of the present invention.

FIG. 2 is an illustration of how user's routes could be generated by the methodology. The solid lines 16 represent the traveled route for the mobile wireless devices 10 (and hence the runners carrying the mobile wireless devices 10) with the dotted lines 18 representing the currently planned future route. Projected intersections are indicated by the circles representing intersections 14. For each instance of mobile wireless devices 10 (e.g., each user), the route back to the respective home/base 20 is considered to ensure the mobile wireless devices 10 remains within range of their home/base 20. In this way, routing information is sent out to each instance of mobile wireless devices 10 for which location and range information is available, with the mobile wireless devices 10 using the routing information to route the users to the intersections 14.

Figure 3:
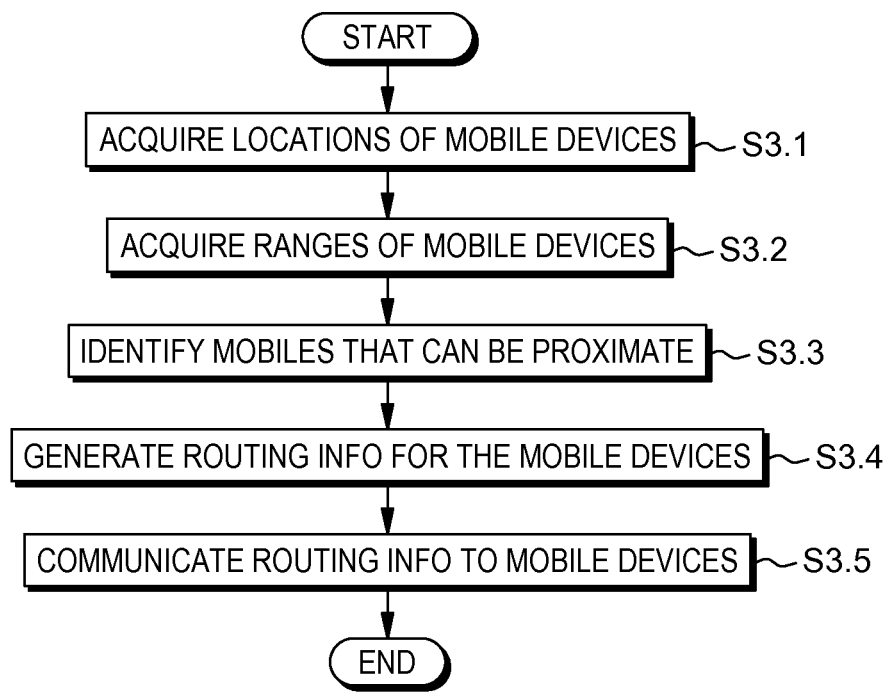
FIG. 3 is a flowchart of a method of routing the mobile wireless devices, in accordance with an embodiment of the present invention.

FIG. 3 summarizes the operating method, from a top-level point of view, independent of the nature of the mobile device being routed by the methodology. The method comprises, at step S3.1, acquiring a current location for each of a plurality of mobile wireless devices 10, at step S3.2, acquiring a range for each of the plurality of mobile wireless devices 10, at step S3.3, identifying a target location (e.g., an instance of intersections 14) where at least two instances of the mobile wireless devices 10 of the plurality of mobile wireless devices 10 can be in proximity given the current locations and ranges of the two mobile wireless devices 10, at step S3.4, generating routing information for the target location (e.g., the instance of intersections 14), and finally, at step S3.5, communicating the generated routing information to at least two mobile wireless devices 10.

The method can either be carried out by a central server communicating with each of the mobile wireless devices 10 or be carried out by the mobile wireless devices 10 themselves as an ad-hoc network of devices that have the necessary functionality to communicate locally. The acquisition of the current location and range of the mobile wireless devices 10 may involve querying individual mobile wireless devices 10 for location and range information or may involve accessing stored information that has previously been generated. For a central server, once a target location (e.g., an instance of intersections 14) has been identified, then the server communicates routing information to the relevant mobile wireless devices 10. The routing information may be device specific, in the form of a route to travel to reach the target location, or may just be a standard description of that location, as GPS coordinates, for example. Generally, the routing information can include one or more waypoints or a set of route instructions.

The methodology can also be implemented as follows. For each instance of mobile wireless devices 10, the server splits the area of possible traversal into smaller defined unit areas; for example, as 1 meter by 1 meter squares. The server stores the collection of defined areas for a mobile wireless devices 10 and updates the stored data over time. The server communicates with other mobile wireless devices 10 in order to determine the set of overlapping areas by calculating the intersections of respective sets of reachable areas of mobile wireless devices 10. In additional embodiments, the server also considers the current speed of each instance of mobile wireless devices 10. This process results in the identification of target areas that can be reached by multiple mobile wireless devices 10.

As discussed above, multiple embodiments of this communication with the mobile wireless devices 10 can be used. Firstly, a central server could be coordinating the mobile wireless devices 10 and relaying the messages to each other in a centralized process. Secondly, the mobile wireless devices 10 could in fact be decentralized and rely on peer-to-peer technologies, by creating ad-hoc mesh networks for example, to relay information. Two connected instances of mobile wireless devices 10 can agree upon a single area (e.g., an instance of intersections 14) to intersect, using a handshake mechanism similar to that used in transmission control protocol (TCP). Each instance of mobile wireless devices 10 can then adjust respective routing to reach the target area (e.g., an instance of intersections 14). In one embodiment, the two mobile devices generate an agreed waypoint, and at least one device communicates the agreed waypoint to each of the mobile wireless devices 10 that can reach the agreed waypoint.

The steps of FIG. 3 can be repeated at regular intervals appropriate for the type of mobile wireless devices 10 being used thereby ensuring that routes are smooth and appropriate. For instance, for runners, ensuring the objective of intersections does not mean that the runners are running back and forth along the same road repeatedly when a more varied route will be preferable. Therefore, restrictions on the limits of the (re)routing are desirable in order to ensure that the runners use a continuous route. The methodology can have applicability in areas where road infrastructures are less developed and hence drones are ideal delivery vehicles due to a drones' ability to travel as the crow flies and independently of the infrastructure on the ground.

In the embodiment of the routing method using drones, a slight adjustment to the positioning of the drones can be made if the drones exist as peers, communicating amongst themselves, in which the drones are controlled so that the drones should adjust positioning for maximum constructive interference. This technology (as a product of beamforming) can be used in addition to the routing of the drones so that they move into the same approximate location so that they also are positioned relative to each other to produce constructive interference in their local radio communications.

Figure 4:
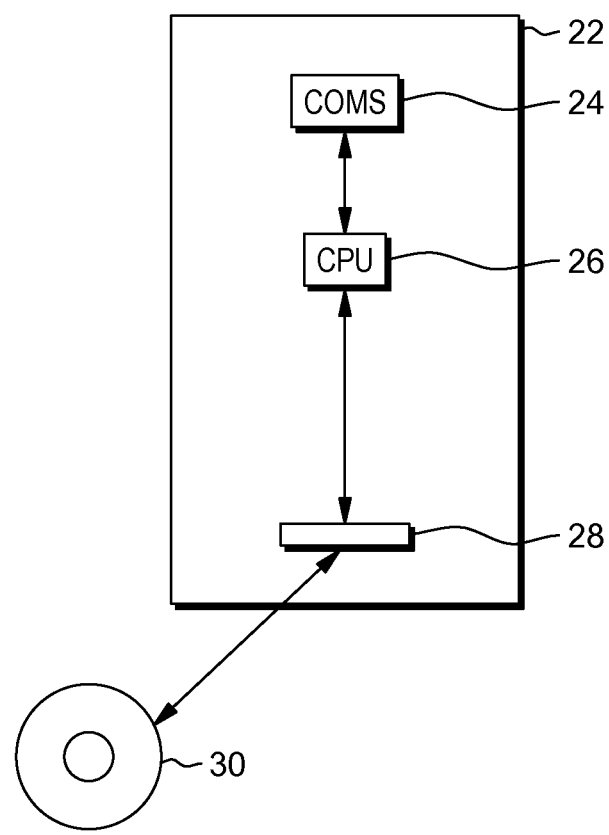
FIG. 4 is a schematic diagram of a system for routing the mobile wireless devices, in accordance with an embodiment of the present invention.

FIG. 4 shows a server 22 (e.g., a central server), which comprises a communication unit 24, a processor 26 connected to the communication unit 24, and an external interface 28 also connected to the processor 26. A CD-ROM 30 is provided, which is a computer readable medium containing a computer program product that comprises instructions for controlling the operation of the processor 26. The server 22 communicates with the individual instances of mobile wireless devices 10 that are being routed according to the methodology discussed above. In various embodiments, server 22 can communicate utilizing network communications. Network communications can be, for example, a local area network (LAN), a telecommunications network, a wide area network (WAN), such as the Internet, or any combination of the three, and include wired, wireless, or fiber optic connections. In general, the network communications can be any combination of connections and protocols that will support communications between server 22 and one or more instances of mobile wireless devices 10, in accordance with embodiments of the present invention. The server 22 embodies a system that provides the routing information to the mobile wireless devices 10.

The communication unit 24 acquires the current location of the plurality of mobile wireless devices 10 (either from the mobile wireless devices 10 themselves or from the wireless network hardware) and acquires a range for each of the plurality of mobile wireless devices (again either directly from the mobile wireless devices 10 or from a local database). The processor 26 connected to the communication unit 24 identifies at least two of the mobile wireless devices 10 that can reach a target location (e.g., an instance of intersections 14) where the devices can be in proximity given the current locations and ranges of the two mobile wireless devices 10 and will therefore generate routing information for the target location, which the communication unit 24 will communicate to the mobile wireless devices 10.

Figure 5:
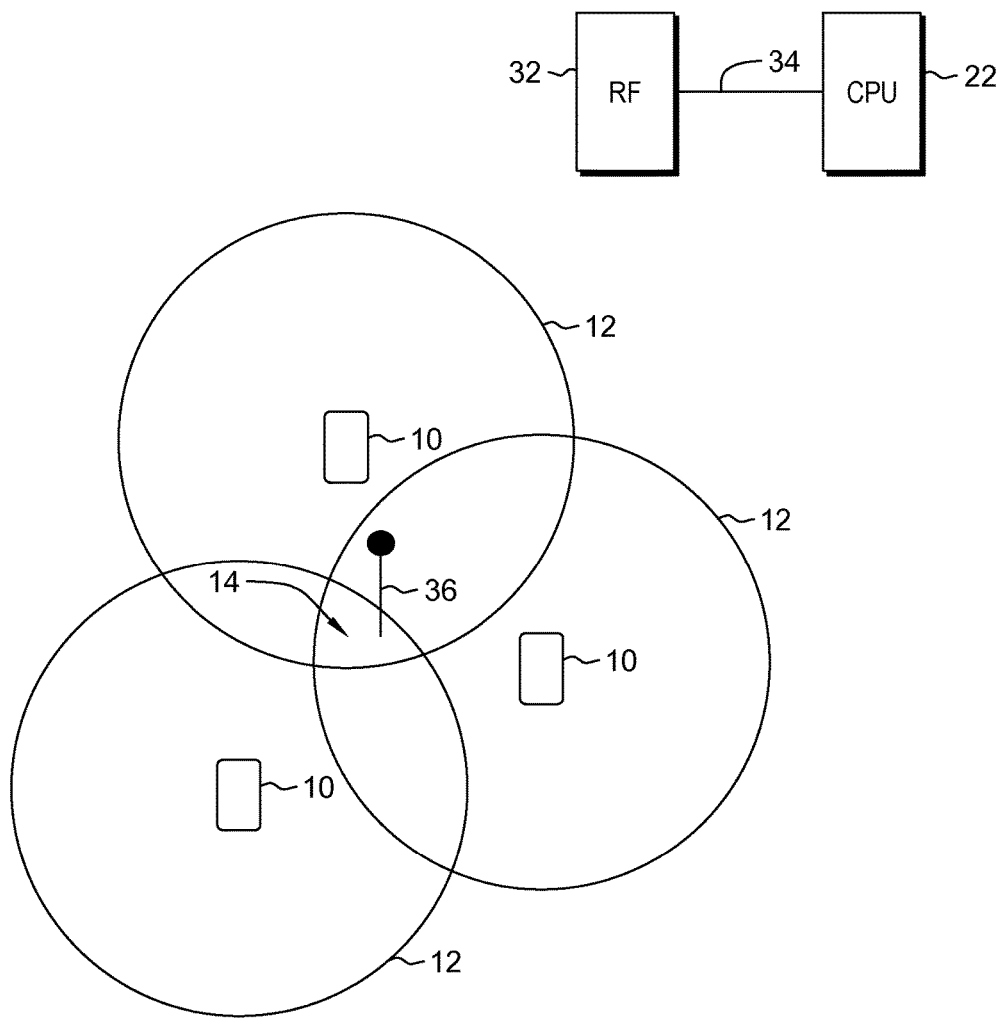
FIG. 5 is a schematic diagram of mobile wireless devices and a system for routing the mobile wireless devices, in accordance with an embodiment of the present invention.

FIG. 5 shows an embodiment of the routing system in which three mobile wireless devices 10 are in wireless communication with a wireless communication station 32. The wireless communication station 32 is connected to a server 22 via a wired network 34, such as the Internet. The current ranges of the mobile wireless devices 10 are shown by the circles 12. In an example embodiment, the mobile wireless devices 10 are mobile phones being carried by runners. The server 22 will operate to route the mobile wireless devices 10 so that the devices are in proximity. Being in proximity can be defined as bringing the mobile wireless devices 10 within a predefined distance, such as less than five meters or less than fifteen meters, for example. Each instance of mobile wireless devices 10 has information associated therewith, which includes the device's current location, range, and speed. Each instance of mobile wireless devices 10 stores the information and communicates it to the server 22 via the wireless communication station 32.

The server 22 acquires the current location, speed, and range for each of the mobile wireless devices 10 under consideration and identifies a target location (e.g., an instance of intersections 14) that at least two of the mobile wireless devices 10 can reach at the same time using the current locations, speeds, and ranges of the mobile wireless devices 10 in question. Although the server 22 will start by considering only two such mobile wireless devices 10, as many additional mobile wireless devices 10 as possible will be considered that can reach the target location. The server 22 generates routing information 36, which in this embodiment is a waypoint. The server 22 communicates the routing information 36 to each of the mobile wireless devices 10 that can reach the target location (e.g., an instance of intersections 14). The server 22 makes this communication to the mobile wireless devices 10 via the wireless communication station 32.

Figure 6:
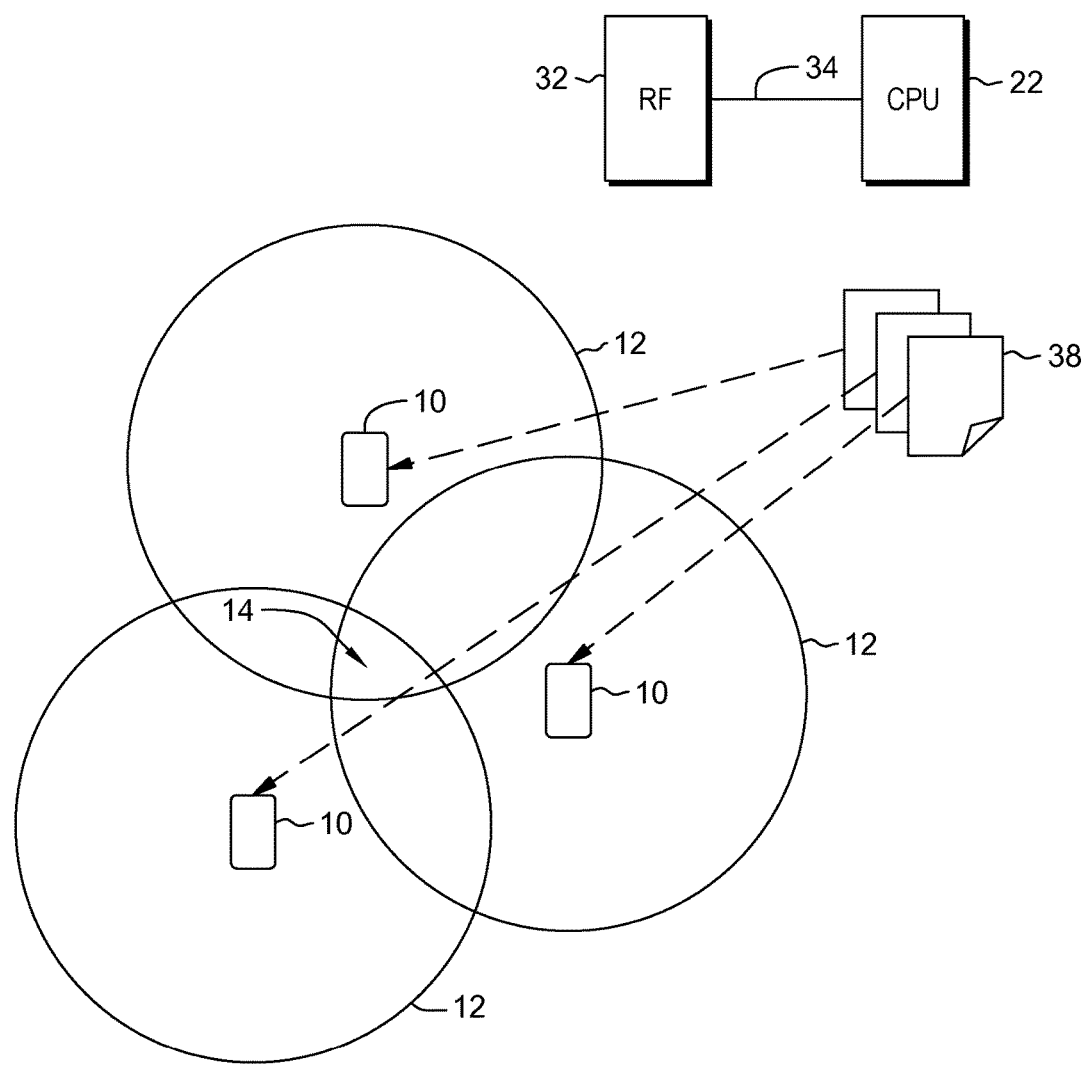
FIG. 6 is a schematic diagram of mobile wireless devices and a system for routing the mobile wireless devices, in accordance with an embodiment of the present invention.

FIG. 6 shows a further embodiment of the routing system in which again three mobile wireless devices 10 are in wireless communication with the wireless communication station 32. The wireless communication station 32 is connected to the server 22 via the wired network 34, such as the Internet. Each instance of mobile wireless devices 10 has information associated therewith, which includes the current location of the device, range, and speed, and this information is received by the server 22 and processed to determine a target location (e.g., an instance of intersections 14) that can be reached by at least two of the mobile wireless devices 10. The server 22 selects the target location to which the greatest number of mobile wireless devices 10 can reach in order to provide the best possible experience to the runners carrying the mobile wireless devices 10.

In this embodiment, the server 22 generates routing instructions 38 for the target location (e.g., an instance of intersections 14) that comprises respective routing instructions for each of the mobile wireless devices 10 that can reach the target location (e.g., an instance of intersections 14). Individual instances of routing instructions 38 are provided that are specific for the mobile wireless devices 10 in question. Each set of routing instructions 38 includes routing instructions that are specific to the respective mobile wireless devices 10 and can enable that instance of mobile wireless devices 10 to reach the target location. The routing instructions 38 might comprise a set of waypoints for the specific instance of mobile wireless devices 10 based on the device's current location and the target location (e.g., an instance of intersections 14), which can be used by the respective mobile wireless devices 10 to rout the mobile wireless devices 10 to the target location.

Figure 7:
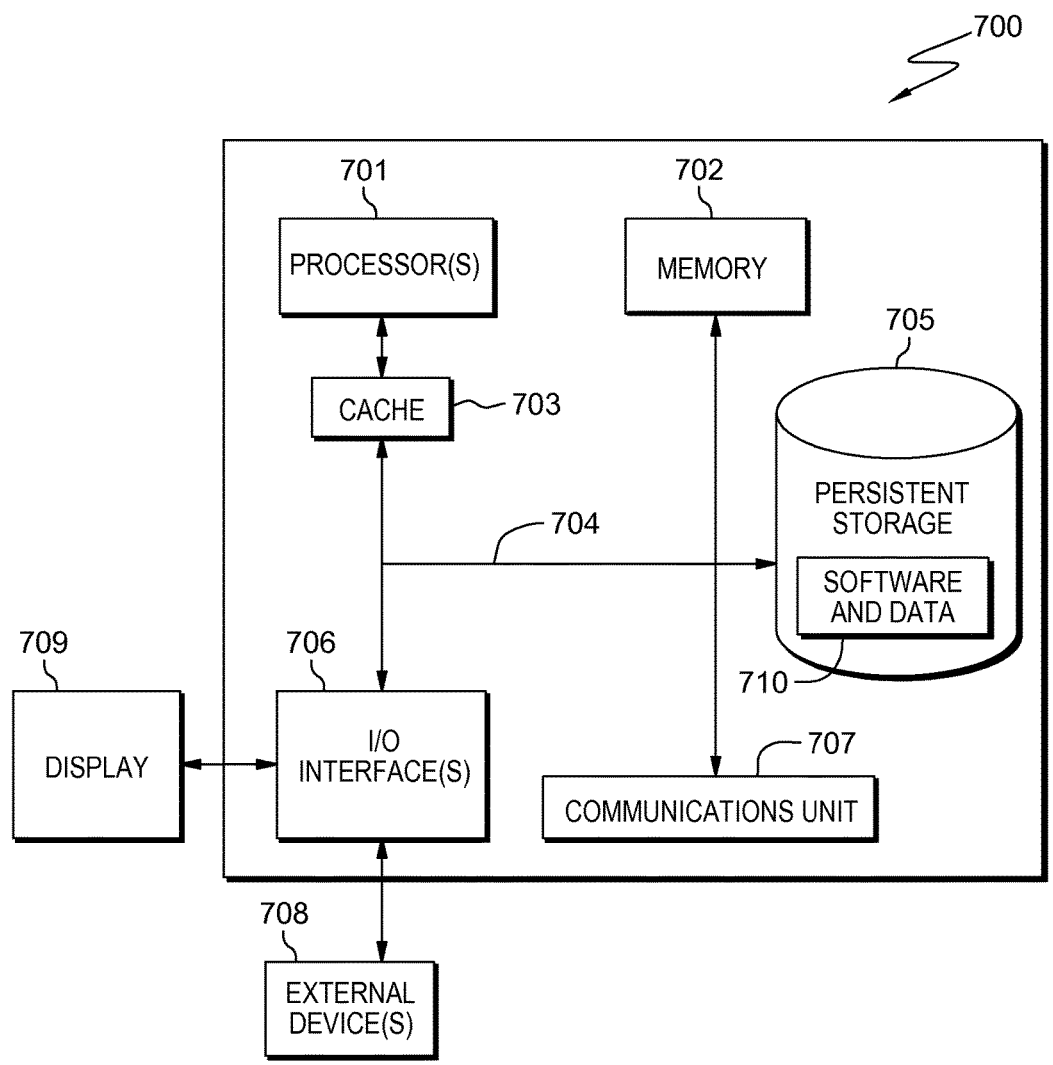
FIG. 7 depicts a block diagram of components of a computing system, in accordance with an embodiment of the present invention.

FIG. 7 depicts computer system 700, which is representative of server 22, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made. Computer system 700 includes processor(s) 701, cache 703, memory 702, persistent storage 705, communications unit 707, input/output (I/O) interface(s) 706, and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processor(s) 701 by holding recently accessed data, and data near recently accessed data, from memory 702.

Program instructions and data (e.g., software and data 710) used to practice embodiments of the present invention may be stored in persistent storage 705 and in memory 702 for execution by one or more of the respective processor(s) 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 710 can be stored in persistent storage 705 for access and/or execution by one or more of the respective processor(s) 701 via cache 703.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data (e.g., software and data 710) used to practice embodiments of the present invention may be downloaded to persistent storage 705 through communications unit 707.

I/O interface(s) 706 allows for input and output of data with other devices that may be connected to each computer system. For example, I/O interface(s) 706 may provide a connection to external device(s) 708, such as a keyboard, a keypad, a touch screen, and/or some other suitable input device. External device(s) 708 can also include portable computer readable storage media, such as, for example, thumb drives, portable optical or magnetic disks, and memory cards. Program instructions and data (e.g., software and data 710) used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating routing information, the method comprising:
    acquiring, by one or more processors, a current location for each of a plurality of mobile computing devices, wherein each of the plurality of mobile computing devices correspond to a respective user;
    determining by one or more processors, a range that corresponds to each of the plurality of mobile computing devices, wherein a range that corresponds to a mobile computing device is a constrained area that includes locations that the mobile computing device can travel to before having to route to a stopping point, and wherein the determined range is based on an analysis of past running distances by the respective user, defined by physical points that the respective user has run to, of the mobile computing device in relation to a respective distance that the respective user has currently run;
    determining, by one or more processors, a target location at which at least two of the plurality of mobile computing devices can be in proximity, wherein the determined target location is based on the acquired current location of each of the plurality of mobile computing devices and the determined ranges that correspond to each of the plurality of mobile computing devices; and
    generating, by one or more processors, routing information corresponding to the at least two of the mobile computing devices and the determined target location.

2. The method of claim 1, wherein determining the target location at which at least two of the plurality of mobile computing devices can be in proximity comprises:
    acquiring, by one or more processors, a current speed for each of the plurality of mobile computing devices; and
    determining, by one or more processors, a target location at which at least two of the plurality of mobile computing devices can be in proximity, wherein the determined target location is based on the acquired current location of each of the plurality of mobile computing devices, the determined ranges that correspond to each of the plurality of mobile computing devices, and the acquired current speeds of each of the plurality of mobile computing devices.

3. The method of claim 1, further comprising:
identifying, by one or more processors, one or more additional mobile computing devices that are capable of reaching the determined target location based on respective current locations and ranges of the one or more additional mobile computing devices.

4. The method of claim 1, wherein generating routing information, further comprises:
generating, by one or more processors, respective instances of routing instructions for each of the at least two mobile computing devices.

5. The method of claim 1, further comprising:
communicating, by one or more processors, the generated routing information to the at least two mobile computing devices.

6. The method of claim 1, wherein the plurality of mobile computing devices are mobile phones that have wireless communication capability.

7. The method of claim 1, wherein determining range that corresponds to each of the plurality of mobile computing devices, further comprises:
querying, by one or more processors, each of the plurality of mobile computing devices for range information, the range information stored in a database associated with the plurality of mobile computing devices; and
analyzing, by one or more processors, the range information, wherein the range information includes previously generated instances of past running distances.

8. A computer program product for generating routing information, the computer program product comprising:
one or more computer readable storage media and program instructions stored on the one or more computer readable storage media, the program instructions comprising:
program instructions to acquire a current location for each of a plurality of mobile computing devices, wherein each of the plurality of mobile computing devices correspond to a respective user;
program instructions to determine a range that corresponds to each of the plurality of mobile computing devices, wherein a range that corresponds to a mobile computing device is a constrained area that includes locations that the mobile computing device can travel to before having to route to a stopping point, and wherein the determined range is based on an analysis of past running distances by the respective user, defined by physical points that the respective user has run to, of the mobile computing device in relation to a respective distance that the respective user has currently run;
program instructions to determine a target location at which at least two of the plurality of mobile computing devices can be in proximity, wherein the determined target location is based on the acquired current location of each of the plurality of mobile computing devices and the determined ranges that correspond to each of the plurality of mobile computing devices; and
program instructions to generate routing information corresponding to the at least two of the mobile computing devices and the determined target location.

9. The computer program product of claim 8, wherein the program instructions to determine the target location at which at least two of the plurality of mobile computing devices can be in proximity comprise program instructions to:
acquire a current speed for each of the plurality of mobile computing devices; and
determine a target location at which at least two of the plurality of mobile computing devices can be in proximity, wherein the determined target location is based on the acquired current location of each of the plurality of mobile computing devices, the determined ranges that correspond to each of the plurality of mobile computing devices, and the acquired current speeds of each of the plurality of mobile computing devices.

10. The computer program product of claim 8, further comprising program instructions, stored on the one or more computer readable storage media, to:
identify one or more additional mobile computing devices that are capable of reaching the determined target location based on respective current locations and ranges of the one or more additional mobile computing devices.

11. The computer program product of claim 8, wherein the program instructions to generate routing information further comprise program instructions to:
generate respective instances of routing instructions for each of the at least two mobile computing devices.

12. The computer program product of claim 8, further comprising program instructions, stored on the one or more computer readable storage media, to:
communicate the generated routing information to the at least two mobile computing devices.

13. The computer program product of claim 8, wherein the plurality of mobile computing devices are mobile phones that have wireless communication capability.

14. A computer system for generating routing information, the computer system comprising:
one or more computer processors;
one or more computer readable storage media; and
program instructions stored on the computer readable storage media for execution by at least one of the one or more processors, the program instructions comprising:
program instructions to acquire a current location for each of a plurality of mobile computing devices, wherein each of the plurality of mobile computing devices correspond to a respective user;
program instructions to determine a range that corresponds to each of the plurality of mobile computing devices, wherein a range that corresponds to a mobile computing device is a constrained area that includes locations that the mobile computing device can travel to before having to route to a stopping point, and wherein the determined range is based on an analysis of past running distances by the respective user, defined by physical points that the respective user has run to, of the mobile computing device in relation to a respective distance that the respective user has currently run;
program instructions to determine a target location at which at least two of the plurality of mobile computing devices can be in proximity, wherein the determined target location is based on the acquired current location of each of the plurality of mobile computing devices and the determined ranges that correspond to each of the plurality of mobile computing devices; and
program instructions to generate routing information corresponding to the at least two of the mobile computing devices and the determined target location.

15. The computer system of claim 14, wherein the program instructions to determine the target location at which at least two of the plurality of mobile computing devices can be in proximity comprise program instructions to:
- acquire a current speed for each of the plurality of mobile computing devices; and
- determine a target location at which at least two of the plurality of mobile computing devices can be in proximity, wherein the determined target location is based on the acquired current location of each of the plurality of mobile computing devices, the determined ranges that correspond to each of the plurality of mobile computing devices, and the acquired current speeds of each of the plurality of mobile computing devices.

16. The computer system of claim 14, further comprising program instructions, stored on the computer readable storage media for execution by at least one of the one or more processors, to:
- identify one or more additional mobile computing devices that are capable of reaching the determined target location based on respective current locations and ranges of the one or more additional mobile computing devices.

17. The computer system of claim 14, wherein the program instructions to generate routing information further comprise program instructions to:
- generate respective instances of routing instructions for each of the at least two mobile computing devices.

18. The computer system of claim 14, further comprising program instructions, stored on the computer readable storage media for execution by at least one of the one or more processors, to:
- communicate the generated routing information to the at least two mobile computing devices.

19. The computer system of claim 14, wherein the plurality of mobile computing devices are mobile phones that have wireless communication capability.

* * * * *